US 10,801,891 B2

United States Patent
Komljenovic

(10) Patent No.: US 10,801,891 B2
(45) Date of Patent: Oct. 13, 2020

(54) CHIP-SCALE OPTICAL SPECTROMETER

(71) Applicant: Tin Komljenovic, Santa Barbara, CA (US)

(72) Inventor: Tin Komljenovic, Santa Barbara, CA (US)

(73) Assignee: Nexus Photonics LLC, Santa Barbara, CA (US)

( * ) Notice: Subject to any disclaimer, the term of this patent is extended or adjusted under 35 U.S.C. 154(b) by 0 days.

(21) Appl. No.: 16/660,812

(22) Filed: Oct. 23, 2019

(65) Prior Publication Data

US 2020/0217718 A1   Jul. 9, 2020

Related U.S. Application Data

(60) Provisional application No. 62/787,829, filed on Jan. 3, 2019.

(51) Int. Cl.
*G01J 3/28* (2006.01)
*G01J 3/18* (2006.01)
*G01J 3/02* (2006.01)
*G02B 6/12* (2006.01)

(52) U.S. Cl.
CPC ............ *G01J 3/18* (2013.01); *G01J 3/0259* (2013.01); *G01J 3/0297* (2013.01); *G02B 6/12009* (2013.01)

(58) Field of Classification Search
CPC .......... G01J 3/18; G01J 3/0259; G01J 3/0297; G01J 3/26; G01J 3/28; G01J 3/02; G02B 6/12009; G02B 6/26; G02B 6/12
See application file for complete search history.

(56) References Cited

U.S. PATENT DOCUMENTS

2006/0153498 A1*  7/2006  Shen ................ H04B 10/07953
                                                          385/24

* cited by examiner

*Primary Examiner* — Abdullahi Nur
(74) *Attorney, Agent, or Firm* — Shalini Venkatesh

(57) ABSTRACT

An optical apparatus includes a waveguide-based frequency-selective structure with one or more input ports and N1 output ports where N1 is 2 or more. If input signals in a pair of input signals are separated in frequency by an integer multiple of the structure's free spectral range, and one of the pair is routed onto one output port, the other in the pair is also routed onto that port. The apparatus also includes: N2 waveguides, where N2<=N1, each having an input port coupled to a corresponding one of the N1 output ports, and a waveguide output port; N3 frequency-selective elements where N3<=N2, each having an input port coupled to a corresponding one of the N2 waveguide output ports and an output surface from which optical emission occurs at an optical frequency-dependent angle; and an element receiving optical emission from the N3 output surfaces, detecting a corresponding intensity pattern.

18 Claims, 8 Drawing Sheets

CHIP-SCALE OPTICAL SPECTROMETER

FIELD OF THE INVENTION

The present invention relates to optical spectroscopy. More specifically, certain embodiments of the invention relate to a system and a method for realization of photonic integrated circuits providing optical spectroscopy functionality.

BACKGROUND

Optical spectroscopy is a technique to detect the presence and/or the concentration of a substance via its interaction with light. The interaction of light with the substance can lead to absorption, emission, re-emission (at substantially similar wavelength and/or substantially different wavelength from absorbed signal) and scattering of light, the intensity of which, when described as a function of wavelength and/or frequency, is termed a spectrum.

The nature of the spectrum is dependent, among other things, on the chemical composition, temperature, and physical state of the substance. By probing the "fingerprint spectrum" one can determine the substance, concentration of its constituents and other relevant characteristics and/or parameters.

Traditional spectroscopy systems are bulky and expensive, and are most often assembled from bulk optical components; these factors limit their deployment. In recent years, there has been an increasing demand for hand-held devices or even chip-scale devices made as photonic integrated circuit (PIC) that could be integrated and deployed on wider scale in e.g. cellphones or other types of devices.

A PIC is a device that integrates multiple photonic functions and as such is similar to an electronic integrated circuit. The major difference between the two is that a photonic integrated circuit provides functions for information signals imposed on optical wavelengths. PICs can be realized in a number of material systems such as indium phosphide (InP), silicon (Si), planar-lightwave circuit (PLC) technology based on glass materials, etc.

A key component of an optical spectrometer is the subsystem used to acquire the spectral signal and resolve it as a function of wavelength or frequency. Some PIC based on-chip spectrometers have been demonstrated previously, but the need for a scalable, chip-scale integrated spectrometer with high-resolution, wide-bandwidth and stability, as of yet, is unmet in prior art.

SUMMARY OF THE INVENTION

This present invention enables efficient PIC based spectroscopy utilizing a sequential combination of one type of frequency-selective structure, such as an arrayed-waveguide grating (AWG) followed by at least two instances of a second type of frequency-selective structure, such as Bragg gratings, to provide stable signal de-multiplexing for data acquisition by photodetectors and/or detector arrays capable of covering a wide dynamic range of input signal. Resonant structures such as ring resonators may also be included.

In a first embodiment, an optical apparatus comprises a first element comprising a waveguide-based frequency-selective structure with one or more input ports and N1 output ports where N1 or 2 or more, the structure characterized by a free spectral range and a cyclic property such that if one input signal in a pair of input signals separated by a frequency that is approximately an integer multiple of the free spectral range is routed onto a particular output port, the other input signal in the pair is routed onto the particular output port. The apparatus further comprises N2 waveguides, where $1<=N2<=N1$, each waveguide having a waveguide input port coupled to a corresponding one of the N1 output ports, and a waveguide output port; N3 frequency-selective second elements where $1<=N3<=N2$, each of the N3 second elements having an input port coupled to a corresponding one of the N2 waveguide output ports and an output surface from which optical emission occurs at an angle dependent on optical frequency; and a third element configured to receive optical emission from the N3 output surfaces, detecting a corresponding spatial pattern of optical intensity.

In another embodiment, a method for calibrating an optical spectrometer comprising the apparatus of the first embodiment comprises: providing an input signal from a calibration source with known spectral output; controlling first and/or fourth elements while recording third element responses; and calculating calibration coefficients to match the recorded third element response to the input signal from the calibration source.

In yet another embodiment, a method for performing measurements using an optical spectrometer comprising the apparatus of the first embodiment comprises: providing an input signal from a measured to the optical spectrometer; controlling first and/or fourth elements while recording third element responses; and calculating a measurement result using predetermined calibration coefficients and the recorded third element responses to the input signal from the measured.

DETAILED DESCRIPTION

Figure 1:
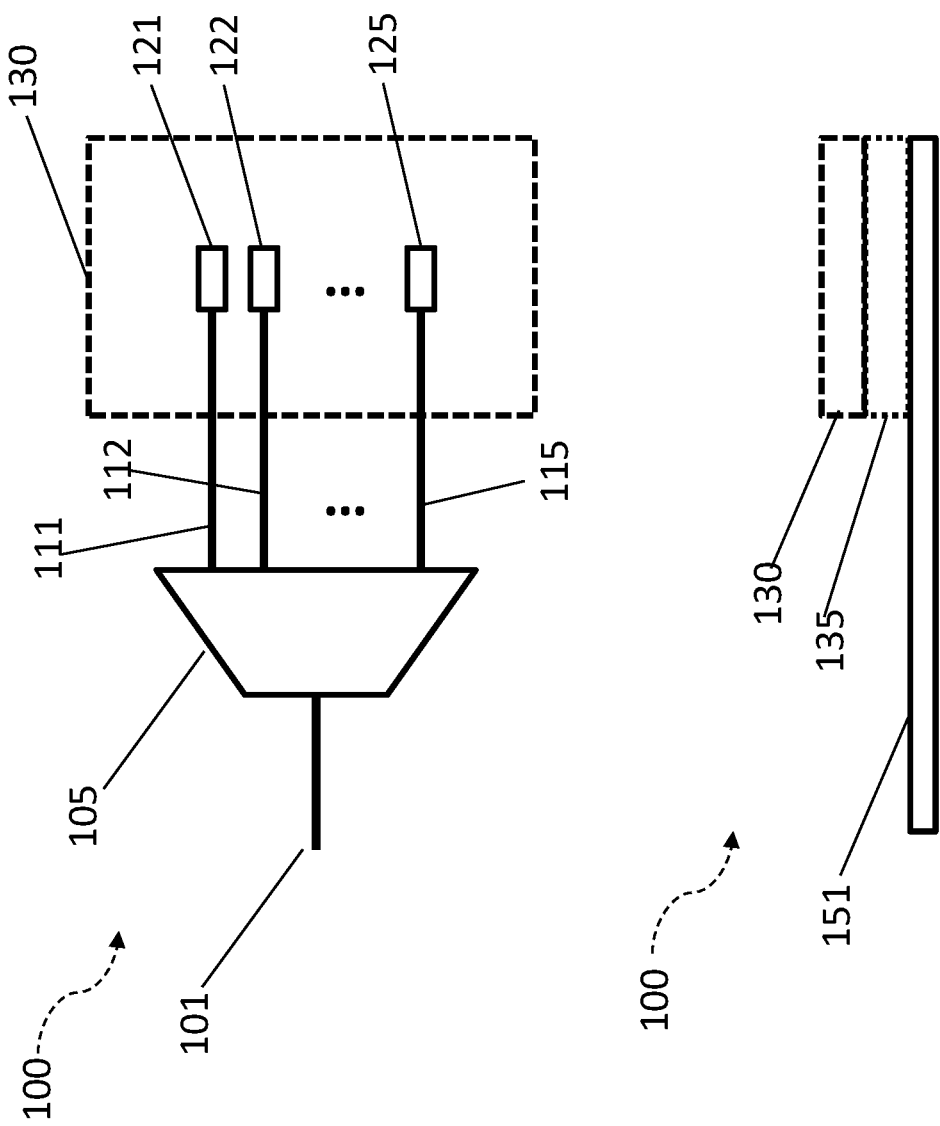
FIG. 1 depicts exemplary schematic drawing of an embodiment of present invention comprising of cyclical arrayed-waveguide grating (AWG) and frequency-selective structures forming the optical spectrometer together with a 2D detector array.

Described herein include embodiments of a system and method for realization of photonic integrated circuit (PIC)

based spectrometer with wide optical bandwidth, high signal-to-noise ratio and improved robustness to external effects.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C), etc.

This present invention enables efficient PIC based spectroscopy utilizing a sequential combination of one type of frequency-selective structure, such as an arrayed-waveguide grating (AWG) followed by at least two instances of a second type of frequency-selective structure, such as Bragg gratings, to provide stable signal de-multiplexing for data acquisition by photodetectors and/or detector arrays capable of covering a wide dynamic range of input signal. Resonant structures such as ring resonators may also be included.

Arrayed waveguide gratings (AWGs) are commonly used in wavelength division multiplexing systems and have been studied extensively. Many embodiments of this present invention utilize the cyclical property of an AWG device designed to have multiple, repeating wavelength responses in a particular output waveguide, separated by the free-spectral range (FSR) of the AWG. Such responses can be designed to have gaps between said repeating wavelength responses, or they can be designed so there are no gaps between said repeating wavelength responses, the latter being the preferred design for this present invention. The cyclical property allows the present invention to subdivide a broadband input signal into a number of portions, each of which comprises signals at a series of wavelengths separated by a spacing substantially equal to the FSR of the AWG, and then to couple each portion into a separate single waveguide. Alternatives to AWGs that similarly exhibit a response that is cyclic over wavelength may be envisaged, such as a very high order Echelle grating, for example.

A single waveguide capturing a portion of the initial signal, after that signal has been divided by AWG, comprises a number of wavelengths separated by spacing substantially equal to the FSR of the AWG. Said spacing is substantially larger than the individual channel spacing of the AWG. Embodiments of the present invention include two or more such waveguides, each waveguide being terminated by a corresponding frequency-selective structure. In some of these embodiments, the terminating frequency-selective structures are realized as first-order Bragg gratings. In other embodiments, these structures are realized as second-order Bragg gratings, used for more efficient out-of-plane coupling. In yet other embodiments, said structures are higher-order Bragg gratings, where order is higher than two. The output angle at which the surface of each of these frequency selective structures emits its output from an output surface depends on wavelength, so each of the wavelengths carried by a particular waveguide in the present invention will be diffracted to emerge from its corresponding receiving frequency selective structure at a substantially different angle. This double-division using the cyclical nature of AWG and the emission angle wavelength dependence of a second-order Bragg grating allows the transformation of a broad frequency optical signal into a 2D mesh that can be efficiently captured by 2D arrays of detectors, allowing the particular frequencies of that signal to be resolved.

An important improvement compared to using just one type of frequency-selective surface to de-multiplex the broad frequency input signal is the increased angular separation that can be provided between individual channels at the surfaces of the second type of frequency-selective structures, as the signals contained in each corresponding waveguide are first separated by the FSR of the first type of frequency-selective structure (typically an AWG), the FSR being larger than the width of each individual channel within the input signal.

Another important improvement afforded by the present invention is a reduced sensitivity to external influences compared to e.g. spectrometers utilizing only ring resonators, as both the AWG and the frequency-selective element exhibit lower dependence on external factors such as ambient temperature than do ring resonators. Said dependence can further be compensated by a look-up table or active calibration, as is known in the art.

In some embodiments, the frequency-selective surfaces of the element after the AWG are arranged in such a way to emit light in a single line, each of said surfaces being offset from another by a pitch that may either vary or be fixed at a constant value for the whole series of surfaces. Such an arrangement allows for the use of a 1D array of detectors that can be more cost effective than the 2D arrays mentioned above.

In yet other embodiments, ring resonators may filter either the input signal before the AWG, or the signals that are generated in a multiplicity of waveguides after the AWG. Said ring resonator filters can be arranged in common configurations such as add-drop or all-pass, and can be used to suppress certain strong signals, or extract certain weak signals to improve the dynamic range of the spectrometer. Design of such ring resonators has been extensively studied. Such filtering property is especially useful for detection of weak non-linear signals due to e.g. Raman or Brillouin scattering or if there is a particularly strong line inside the optical bandwidth of the spectrometer. Said rings, in some embodiments, comprise tuning elements that allow change of resonant wavelength. In some embodiments, said rings are not individual rings, but are arrays of rings, to improve the filtering properties as is known in the art. In yet other embodiments, said ring elements are used to filter out only one single wavelength in each waveguide, improving the signal-to-noise ratio at the detector and/or allowing for more complex signal processing.

In yet another embodiment, the AWG has a tuning element which allows the central wavelengths of individual channels to be shifted. Said tuning is useful for providing the same signal-to-noise ratio across the full optical bandwidth, which might be challenging without the tuning element, as individual channels may have different shapes and roll-offs. With tuning, multiple measurements can be carried out, and the final measurement may be constructed by stitching parts of individual measurements together.

In yet another embodiment, broadband couplers may be present at the input to the AWG/frequency selective structure combination. Broadband couplers operate over broad ranges of wavelengths that they transmit and/or cross-couple. Such couplers can be realized as adiabatic couplers as is known in the art, and can be used to sub-divide the very broad optical spectrum into two or more sub-spectra that are then sub-divided utilizing said combination of AWG and frequency-selective surfaces for final detection. In yet another embodiment, said initial sub-division is performed by yet another AWG and/or other filtering structure as is known in the art.

The upper portion of FIG. 1 depicts a top down schematic view of a PIC spectrometer 100. The exemplary drawing includes a single-mode input waveguide 101 connected to arrayed-waveguide grating (AWG) 105. Said AWG being a cyclical AWG designed to have multiple, repeating wavelength responses in a particular output waveguide that are separated by free-spectral range (FSR) of the AWG. Few of the output waveguides are shown 111, 112 and 115, but said number is only for illustrative purposes. A typical AWG might have as few as two outputs or as many as hundreds or more. Each of said output waveguides 111, 112 and 115 receives a number of wavelengths from the input waveguide 101, where said wavelengths in each particular output waveguide are separated by spacing substantially equal to free-spectral range (FSR) of the AWG. FSR is an inherent property of particular AWG, and describes frequency spacing at which wavelengths get routed into same particular waveguide. Each of said output waveguides 111, 112 and 115 are routed to corresponding frequency-selective element 121, 122 and 125. In one embodiment the number of frequency-selective elements matches the number of output waveguides. In yet another embodiment, the number of frequency-selective elements is smaller than the number of AWG output waveguides. Said frequency-selective elements diffract incoming signal at a particular angle. Said angle being a function of signal wavelength as will be described with the help of FIG. 3. A detector array 130 that can comprise of 2D array of InGaAs based detectors, Ge based detector, Si based detectors and/or other photo-detectors known in the art for detecting optical signals of particular wavelength is placed in relative proximity to said frequency-selective elements 121, 122 and 125. In some embodiments the 2D array can be made up of CMOS or CCD sensors. In some embodiments, the 2D arrays have one or more coatings deposited thereupon to filter-out unwanted signals.

A schematic side view of spectrometer 100 is shown in the lower part of FIG. 1. The spectrometer comprises waveguide layer 151, including elements 101, 105, 111, 121 etc. Said waveguide layer can be a multilayer structure such as silicon on silicon-oxide on silicon (e.g. silicon-on-insulator—SOI) or silicon-nitride on silicon-oxide on silicon, or any other combination of materials suitable for waveguide operation at wavelength range of interest. Said examples are only for illustrative purposes, and it is clear that multiple other waveguide structures can be conceived without departing from the spirit of invention. In some embodiments said layer 151 comprises more than one waveguide plane for additional functionality and/or easier routing. Detector array 130 is placed in proximity of waveguide layer 151, said distance being an optimization parameter. In one embodiment there is a spacer element 135 to control said distance. In yet another embodiment (not shown), the detector array 130 is placed on the bottom side of the wafer and substrate (not shown) serves as spacer. In yet another embodiment there is no spacer 135, and materials deposited on top of waveguides in layer 151 serve as spacer. In yet another embodiment (not shown), detector array 130 and waveguide layer 151 are not in contact, but packaging techniques involving mirrors and/or lenses provide robust optical coupling.

Figure 2:
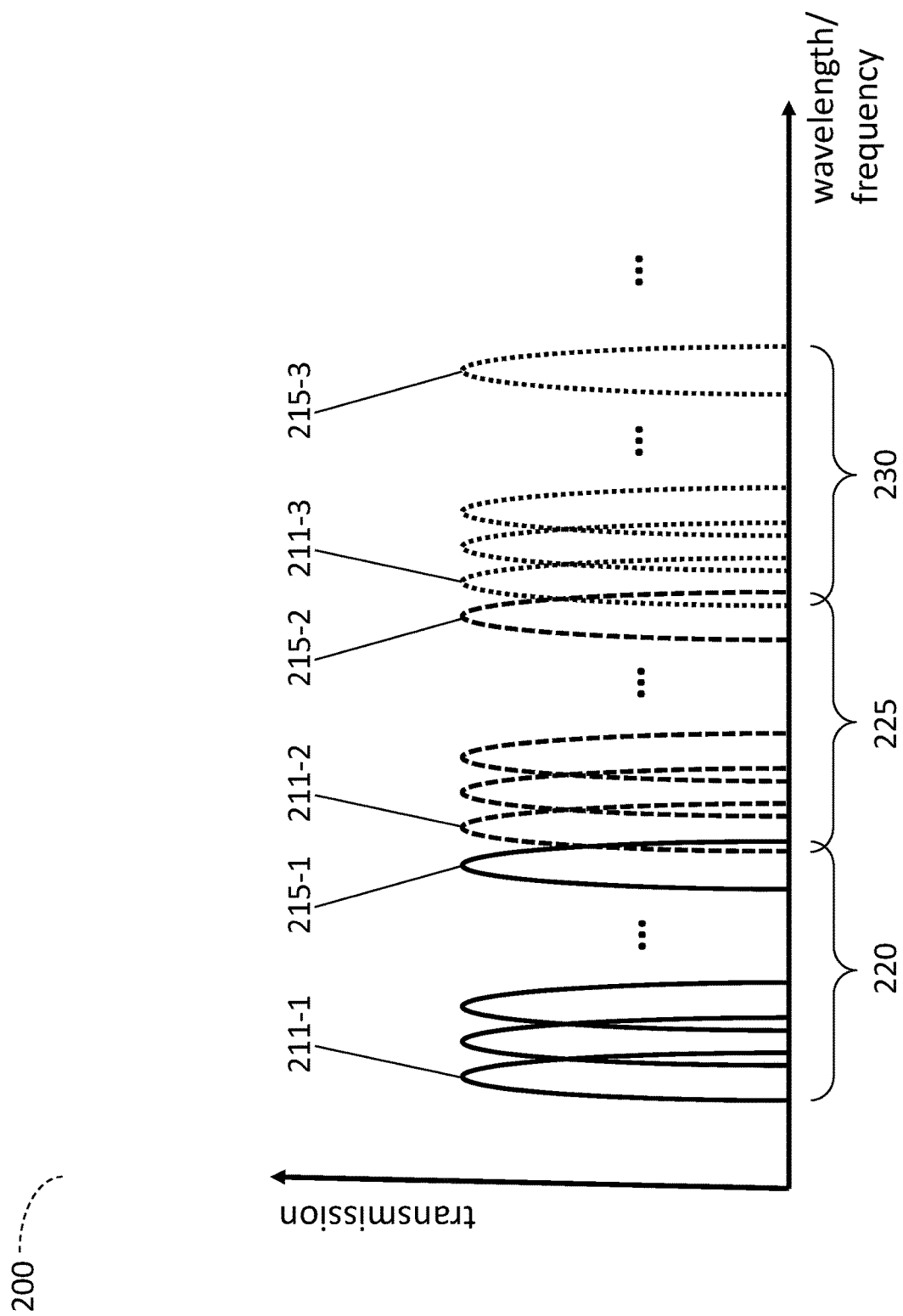
FIG. 2 depicts the cyclical nature of AWG and illustrates how channels separated by AWG free-spectral range are coupled into particular waveguides.

FIG. 2 depicts the cyclical nature of AWG and illustrates how channels separated by AWG free-spectral range are coupled into particular waveguides. In this illustrative figure, three different free-spectral ranges (FSRs) are shown 220, 225 and 230. Each FSR comprises of a number of channels outputted to different waveguides, where only the first and the last channel is marked with a number, e.g. 211-1 is the first channel and 215-1 is the last channel for particular FSR 220. In this illustrative figure, channel 211-1 is the first channel coupled to waveguide 111 belonging to FSR 220, channel 211-2 is the second channel coupled to waveguide 111 belonging to FSR 225, channel 211-3 is the third channel coupled to waveguide 111 belonging to FSR 230, etc. for other FSRs. Similarly channels 215-1, 215-2 and 215-3 are coupled to waveguide 115.

Figure 3:
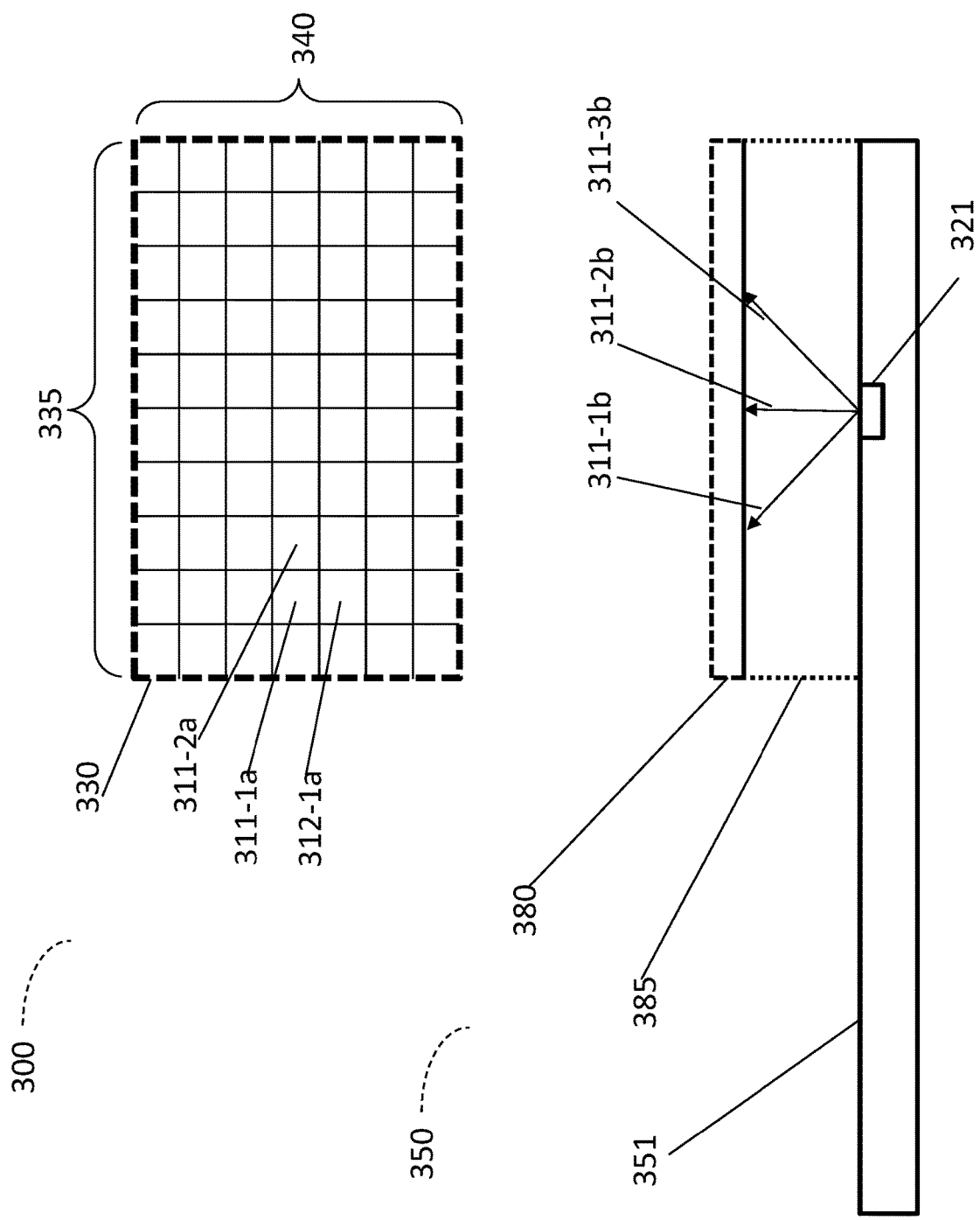
FIG. 3 depicts a schematic diagram of an embodiment of present invention that illustrates how broadband optical signal is de-multiplexed to a 2D array of detectors using a combination of AWG and frequency-selective element.

FIG. 3 illustrates the decomposition of input signal at a 2D detector array. 300 shows a bottom-up view of detector array 330 comprising rows 335 and columns 340. Each individual element can be a single detector, single pixel on CCD or CMOS sensor or a number of detectors/pixels that are used to detect signal. In various embodiments, regions corresponding to individual elements can be of various size, and number of elements in particular row and/or column can vary. It is clear that detector can also be rotated by any amount to optimize the performance. In the embodiment illustrated in side view 350, analogous to the side view of spectrometer 100 shown in the lower part of FIG. 1, the waveguide layer 351 guides and demultiplexes the light using cyclical AWG as described above. In one of the embodiments, said demultiplexed light in one of the output waveguides arrives to frequency-selective element 321 that scatters each signal of certain wavelength to characteristic angle. Said angle can be optimized by controlling the effective mode index, periodicity of frequency-selective structure and by placing an element 385 with optimized refractive index between the element 321 and detector array 380 among other things as is known in the art. In one of the embodiments, the substrate is used to couple the light from element 321 to detector array 380. In yet another embodiment mirrors and lenses (not shown) are used to couple light from element 321 to detector array 380.

The output angle (θ) from frequency selective element 321 is defined by following equation:

$$n_1 \sin(\theta) = n_{\mathit{eff}} - \frac{m\lambda}{\Lambda},$$

where $n_1$ is refractive index of cladding, $n_{\mathit{eff}}$ is the effective index of guided mode, m is the diffraction order, $\lambda$ is the wavelength of light and $\Lambda$ is period or pitch of the frequency-selective element. From equation once can directly calculate the emission angles of certain wavelengths separated by AWG FSR arriving to frequency selective element 321 providing second level of demultiplexing of input signal. To illustrate how said dual-level demultiplexing forms a 2D array, we show output rays 311-1b, 311-2b and 311-3*b* being diffracted at different directions. Mapping said diffraction to 2D detector array 330, the grating diffracted elements arrive at different rows 335 as shown with 311-1*a* and 311-2*a*. Signals from neighboring waveguides arrive at different columns of the detector as illustrated by 311-1*a* and 312-1*a*, where 311-1*a* originates from waveguide 111 and 312-1*a* originates from waveguide 112. As the separation between individual signals in particular waveguide is now equal to AWG FSR which is larger than channel spacing, this present invention diffracts individual signals in particular waveguide by larger angular difference allowing for simplified and more precise signal detection.

Figure 4:
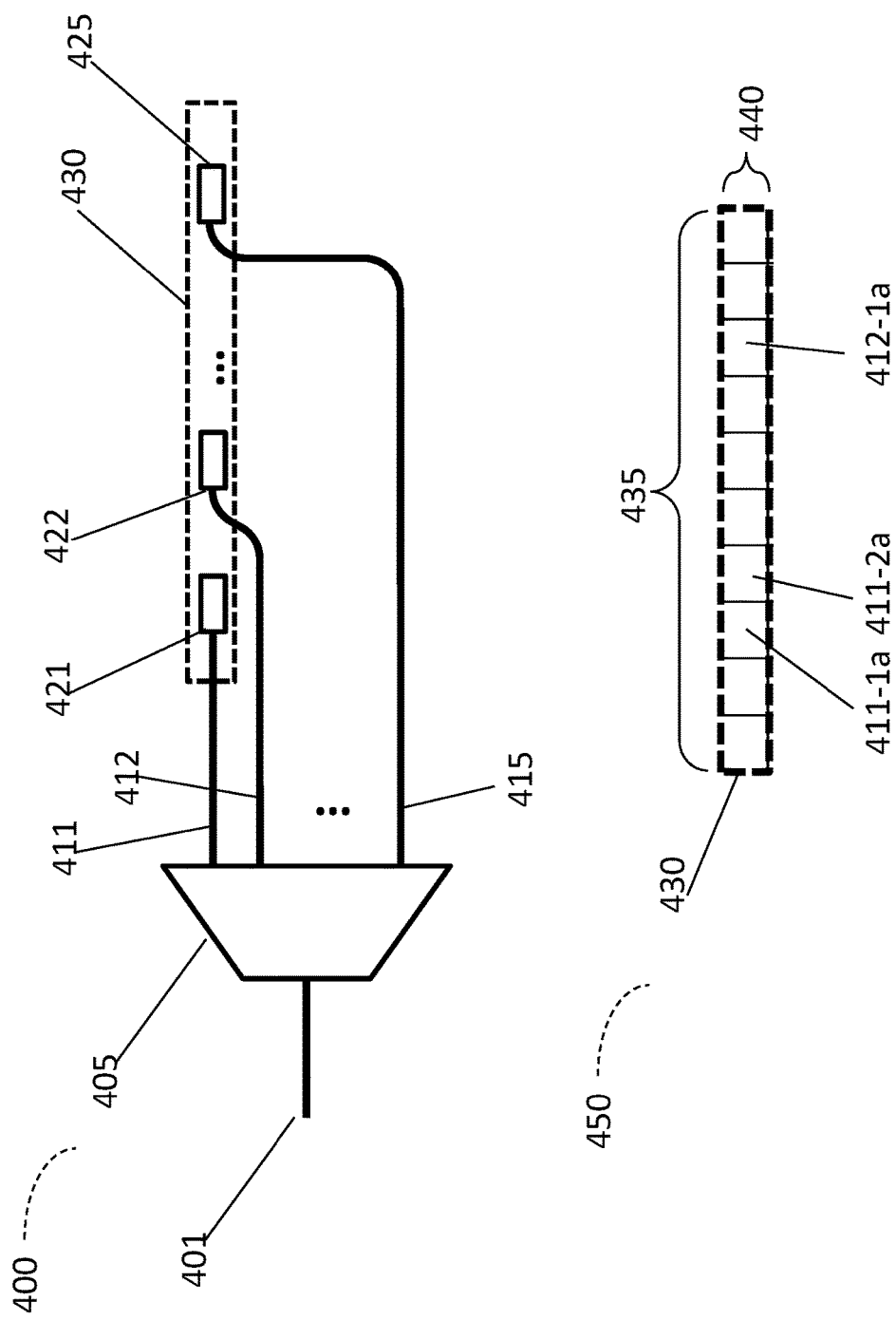
FIG. 4 depicts a schematic diagram of an embodiment where frequency selective elements are arranged in such way that spectrometer can utilize 1D array of detectors.

FIG. 4 depicts schematic diagrams of an embodiment where frequency selective elements are arranged in such a way that the spectrometer, shown in top-view 400, can utilize a 1D array of detectors 430. The first stage of demultiplexing input signal 401 is performed in a similar way using cyclic AWG 405 as previously described. AWG 405 demultiplexes the input signal into a number of outputs 411, 412 and 415. These outputs are routed to frequency selective elements 421, 422 and 425 that are arranged in such way that the output from all the frequency selective elements can be efficiently captured by 1D array of detectors. Use of 1D arrays can reduce the cost of certain type of detectors compared to 2D arrays among other potential benefits.

Schematic view 450 at the lower part of FIG. 4 shows how wavelengths may be mapped to utilize 1D detector array 430. Said detector array 430 has multiple columns 435, but only one row 440. In such a detector, different wavelengths separated by AWG FSR that are outputted by e.g. waveguide 411 are emitted from the same frequency-selective element 421 and are detected by neighboring detector elements 411-1*a* and 411-2*a*, etc. Outputs from neighboring waveguide 412 are detected by detector elements 412-1*a*, etc. that are horizontally offset from e.g. detector elements 411-1*a*, etc. Said offset, in some embodiments, is substantially equal to distance corresponding to the multiple of individual detector element width and number of channels in the AWG.

Figure 5:
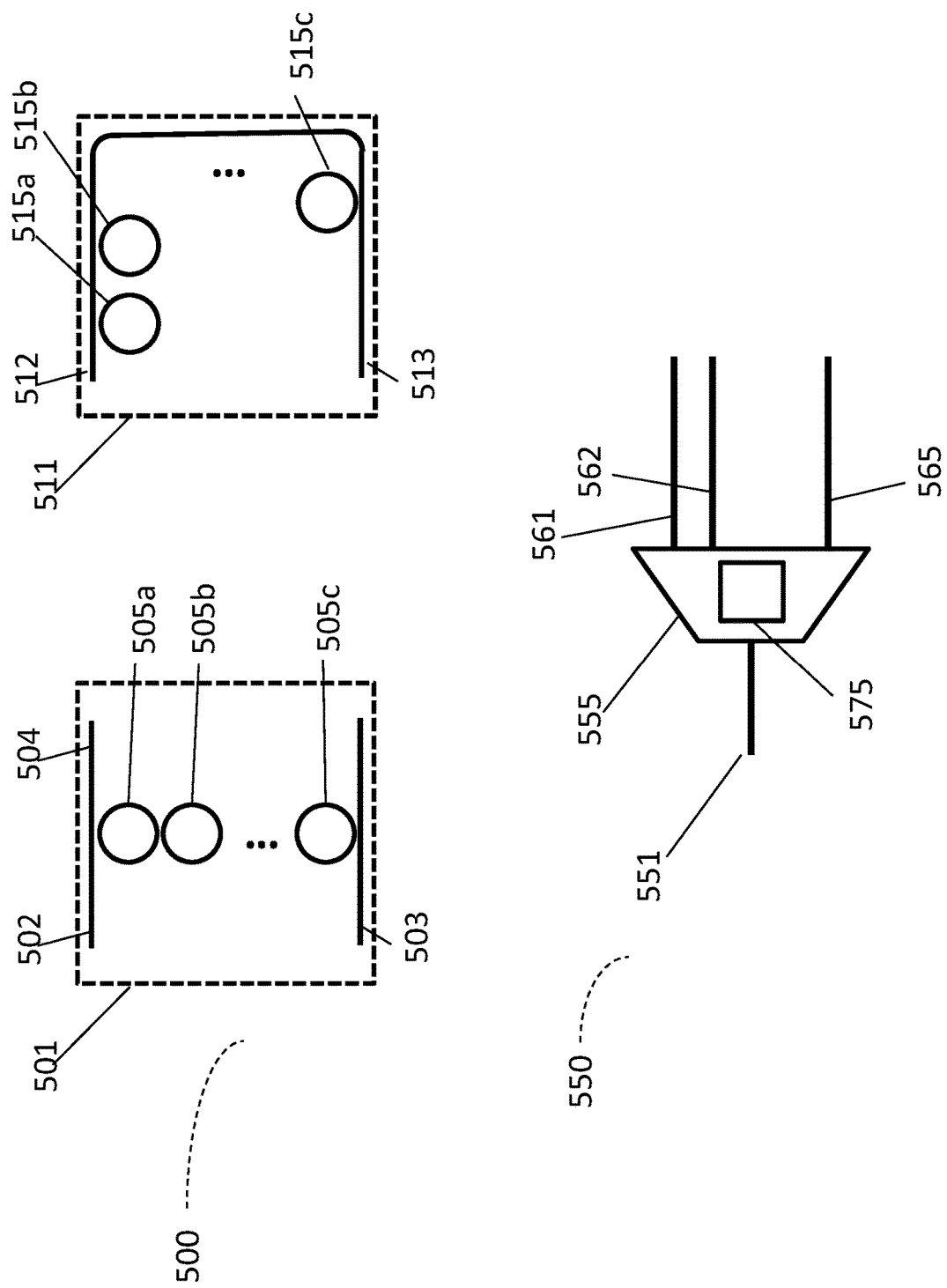
FIG. 5 depicts certain blocks of certain embodiments of present invention where ring-resonator structures blocks provide additional filtering of input signals and where AWG has a tuning element.

FIG. 5 depicts certain blocks of certain embodiments of present invention where ring-resonator structures blocks 500 provide additional filtering of input signals and where AWG has a tuning element 550.

Said ring resonator structure blocks 500 can be arranged in common configurations such as add-drop 501 or all-pass 511, and can be used to suppress certain strong signals, or extract certain weak signals to improve the dynamic range of the spectrometer. Such structures are commonly made tunable to control the resonance wavelength. Add-drop configuration 501 has four optical ports, but only three are used. Port 502 is commonly called input port. If the input optical signal wavelength corresponds to the resonant wavelength of ring resonators, the input signal is substantially transmitted to output port 503 which is commonly called drop port. In case input optical signal wavelength differs from the resonant wavelength of ring resonators, the input signal is substantially transmitted to output port 504 which is commonly called pass port. In certain embodiments said filter element 501 can comprise of only one ring. In yet another embodiment, said filter element 501 comprises of additional rings. Such multi-ring structures can provide superior filtering performance. In multi-ring case, e.g rings 505*a*, 505*b* and/or 505*c* in illustrative embodiment in 501 can have substantially similar free-spectral range (FSR). Frequency of the ring FSR is defined by the inverse of the round trip time along ring circumference. In yet another embodiment, said rings have substantially different FSRs which generally allows more efficient tuning and larger combined FSR range.

All pass configuration 511 has two optical ports. Port 512 is commonly called input port. If the input optical signal wavelength corresponds to the resonant wavelength of ring resonators, the input signal is substantially attenuated before reaching output port 513 which is commonly called pass port. In case input optical signal wavelength differs from the resonant wavelength of ring resonators, the input signal is substantially transmitted to output port 513. In certain embodiments said filter element 511 can include only one ring. In yet another embodiment, said filter element 511 comprises additional rings. Such multi-ring structures can provide superior filtering performance. In a multi-ring case, e.g rings 515*a*, 515*b* and/or 515*c* in illustrative embodiment in 511 can have substantially similar FSR. In yet another embodiment, said rings have substantially different FSRs.

It is understood that other combinations of add-drop and/or all-pass ring configurations are possible with substantially similar functionality without departing from the spirit of present invention.

Structure 550 illustrates an AWG 555 with tuning capability. In certain embodiments said tuning element 575 allows shifting of the central wavelengths of individual channels 561, 562 and/or 565. Said tuning is useful for providing same signal-to-noise ratio across full optical bandwidth, which might be challenging without the tuning element as individual channels have certain shape and roll-off. With tuning, multiple measurements can be carried out, and final measurement of input signal 551 can be constructed by stitching parts of individual measurements with no or reduced gaps in measurements and/or improved signal-to-noise ratio.

Figure 6:
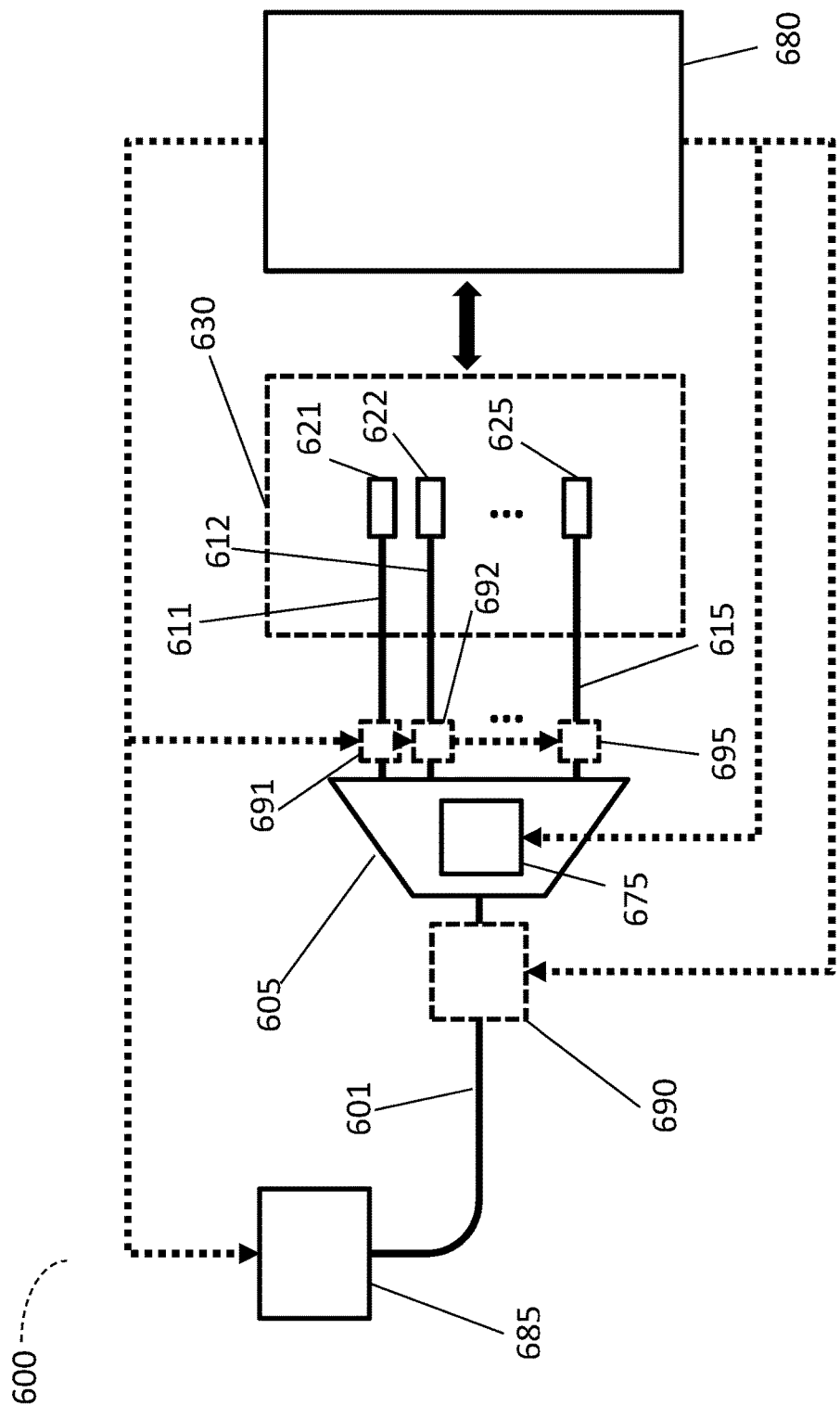
FIG. 6 depicts a schematic diagram of certain embodiment comprising of tunable AWG, additional filtering elements, electronic control and calibrating source.

FIG. 6 depicts a schematic diagram of a certain embodiment of present invention comprising of a tunable AWG 605, additional filtering elements 690, 691, 692 and/or 695, electronic control circuit 680 and calibrating source 685. In one embodiment only filtering element 690 is present, in yet another embodiment only filtering elements 691, 692 and 695 are present. In latter case the number of filtering elements is equal or smaller than number of output waveguides from the AWG. Said filtering elements are realized as structures 501, 511 and/or combination of both as is known in the art. In this particular illustrative embodiment, the frequency selective elements 621, 622 and 625 are arranged in such way that efficient detection of demultiplexed signals is carried out via 2D detector array 630. In yet another embodiment, they are arranged as described with the help of FIG. 4 for efficient detection via 1D detector array. Electronic control circuit 680 controls and reads signals from detector array 630, where such control can include various functionalities such as gating, gain control, averaging, integration, Fourier or Wavelet transforms or other common algorithms for signal acquisition and control including, but not limited to, deep neural networks and AI assisted algorithms. Said electronic circuit 680, in some embodiments, controls the tuning element 675 of the tunable cyclical AWG 605 as described in relation to structure 550. Said control, in certain embodiments, being used to improve the signal acquisition by removing individual channel shape and roll-off effects In yet another embodiment, said control of tuning element 675 is used for advance signal acquisition similarly to sub-pixel interpolation using techniques known in the art.

Electronic control circuit 680, in some embodiments, provides control of additional filtering elements 690, 691, 692 and/or 695 by controlling the tuning mechanisms embedded inside said filtering elements. Said control can improve noise rejection and/or suppress strong signals to allow for acquisition of signals many orders of magnitude smaller that the strong signal. In yet another embodiment, said filtering elements are connected directly to detectors without the frequency-selective element in-between them and provide scanning across wavelengths coupled into particular output waveguide via AWG de-multiplexing as previously explained.

Certain embodiments of present invention might comprise of a calibrating optical source 685. Calibrating optical source can be a broadband optical source or a tunable narrow optical source. Said optical source 685, in some embodiments, can be directly controlled via electronic control circuit 680. In some embodiments optical source 685 is external to the spectrometer. Said optical source is characterized with known output spectral density or output power as a function of wavelength and is used to calibrate the responses of the on-chip spectrometer. Said calibration can be performed in factory during assembly and/or packaging, or can be performed once spectrometer is deployed. In certain embodiments, the on-chip spectrometer comprises of said optical source and can do in-situ calibration and/or re-calibration with no external components needed.

Figure 7:
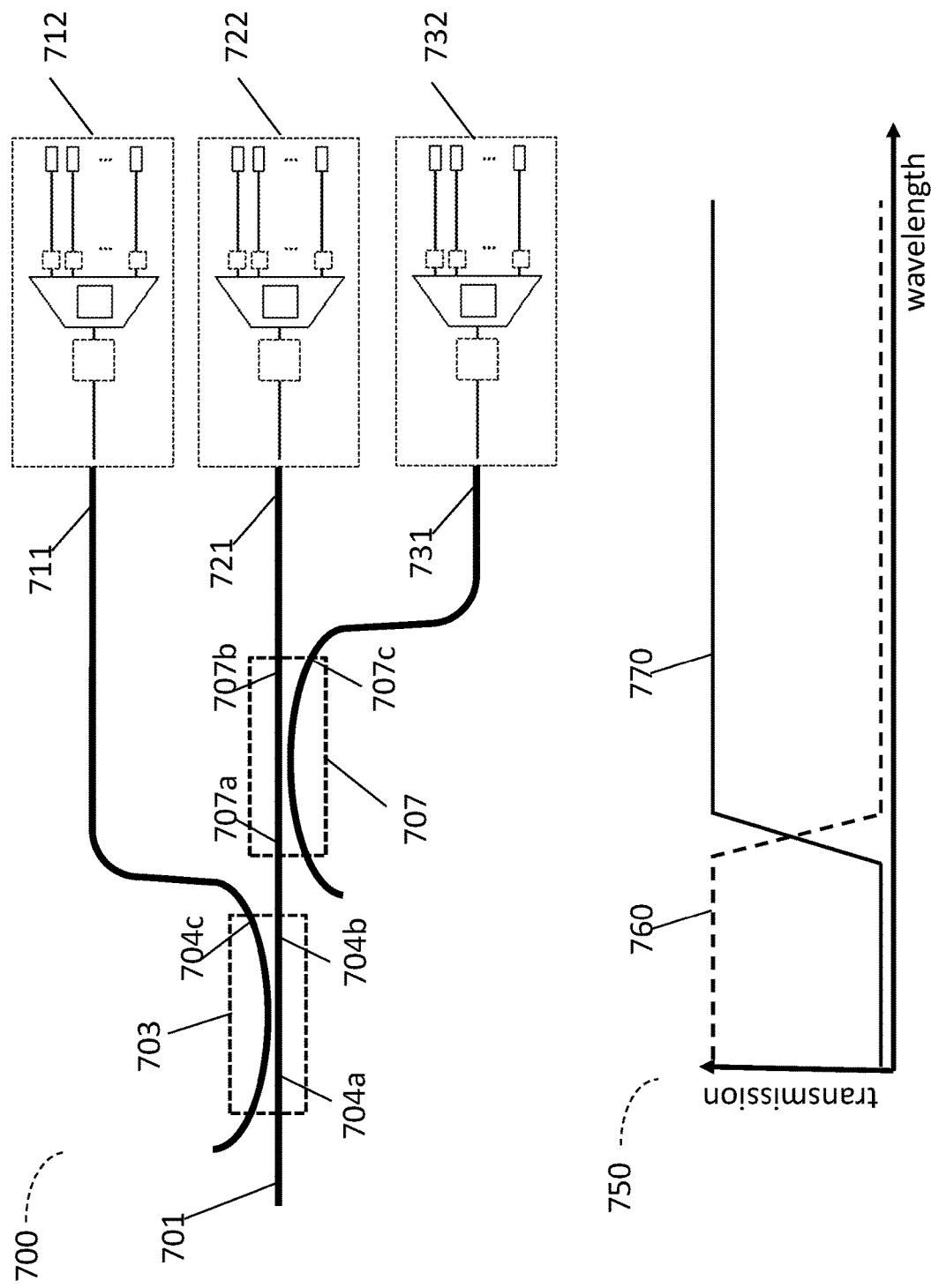
FIG. 7 depicts schematic diagram of certain embodiment comprising of broadband couplers sub-dividing input signal into sub-spectra that are then routed to individual partial spectrometers to cover ultra-broadband wavelength range.

FIG. 7 depicts schematic diagram of certain embodiment of present invention comprising of broadband couplers 703 and 707 sub-dividing input signal into sub-spectra that are then routed to individual partial spectrometers 712, 722 and/or 732 to cover ultra-broadband wavelength range that might not be practical to be addressed with spectrometer architecture comprising of a single AWG. Similar functionality (not shown) can be achieved with a cascade of AWGs with different channel widths and/or spacing. In yet another embodiment, an Echelle grating is used to perform said de-multiplexing.

In 700, a broadband coupler 703, having one operating input port 704a, and two operating output ports 704b and 704c provides initial spectral de-multiplexing. Said output port 704b is commonly referred to as pass port, and said output port 704c is commonly referred to as cross port. Operation of broadband coupler 703 is explained with the help of 750. Assuming uniform spectral density signal is incident to broadband coupler 703, the transmission, in one embodiment, has a distinct cross-over point in which wavelengths shorter than said cross-over point are substantially transmitted to first output port as illustrated with curve 760, and wavelength longer than said cross-over point are substantially transmitted to second output port as illustrate with curve 770. Such functionality can be realized with adiabatic couplers, or other techniques known in the art.

The process of separating input signal to sub-bands can be cascaded as illustrated with second broadband coupler 707 comprising of one operating input port 707a, and two operating output ports 707b and 707c. Said second broadband coupler 707 can be designed to have its cross-over point at some wavelength that might be different from first broadband coupler 703. It is obvious that said generation of sub-bands of the original input signal can be cascaded in multiple ways without departing from the spirit of invention. In said process, input signal 701 is pre-conditioned to various partial spectrometers at their inputs 711, 721 and/or 731. Each of said partial spectrometers 712, 722 and/or 732 operates as described above. Said partial spectrometers might each comprise of separate detector array, or one larger array can be shared for all the partial spectrometers.

Figure 8:
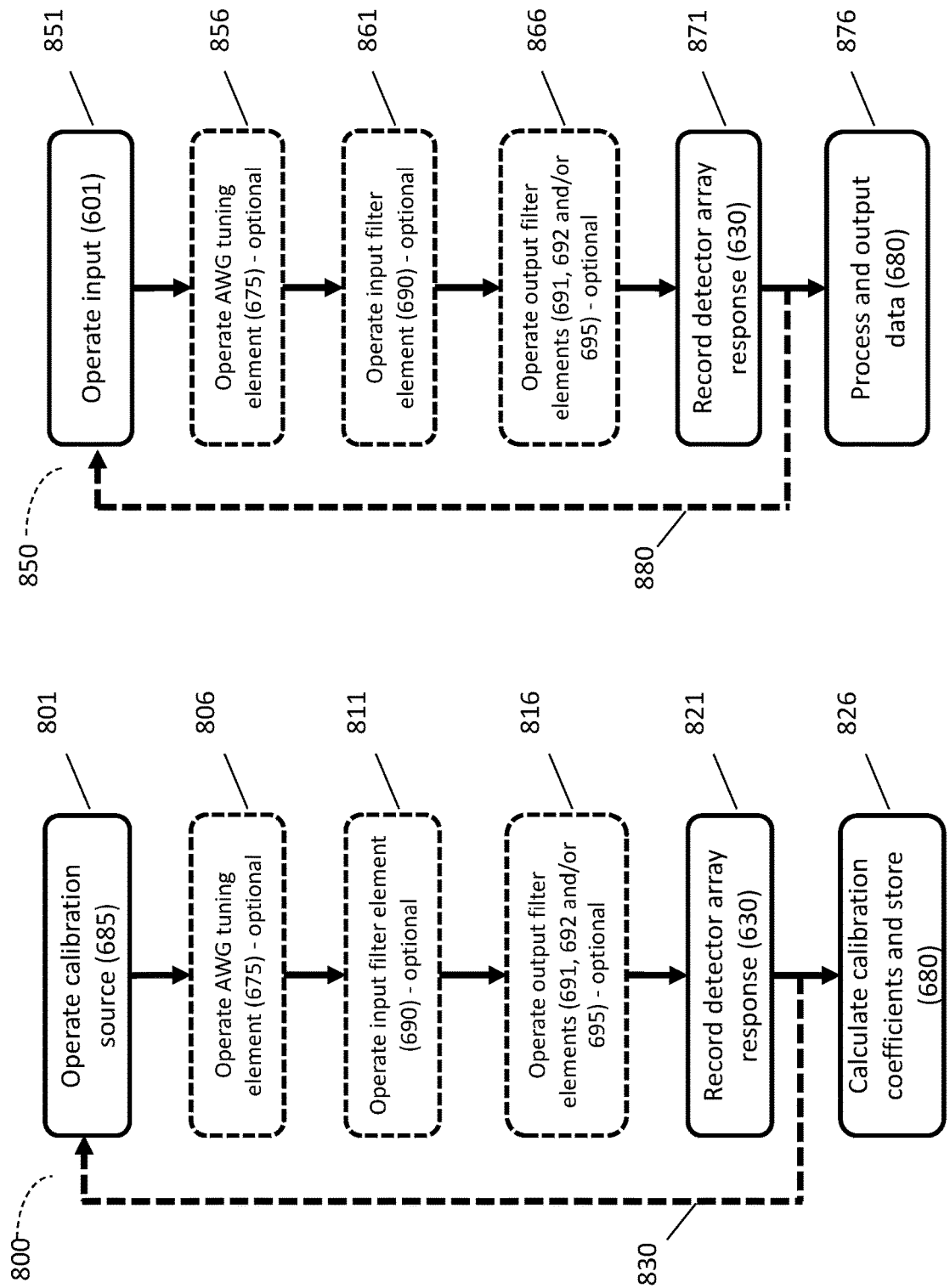
FIG. 8 depicts operations of methods associated with calibration and operation of optical spectrometer, in accordance with various embodiments described herein.

FIG. 8 depict operations of methods associated with calibration and operation of optical spectrometer, in accordance with various embodiments described herein.

Method 800 is a method based on calibration of a spectrometer and begins with operation 801, wherein the calibration source is operated. Operations 806, 811 and 816 are optional and depend on particular embodiment of the spectrometer. Operation 806 performs tuning of the tunable cyclical AWG 605 using tuning element 675. Operation 811 performs control of input filter element 690. Operation 816 performs control of output filter elements 691, 692 and/or 695. Operation 821 records the detector array 630 response together with optional control signals for elements 675, 690, 691, 692 and/or 695. Said set of operations 801, 806, 811, 816, 821 might be performed multiple times and not necessarily in order described here as shown by loop-back arrow 830. In each particular loop one or more parameters that are controlled might be adjusted by electronic control circuit 680 and results stored in memory or other type of storage. Using single or multiple runs through said steps, calibration data is generated from known signal from the calibration source and system imperfections are corrected in software. Calculated coefficients are stored and used in measurements.

Method 850 is a method based on operation of a spectrometer and begins by inputting signal to be measured at input port 601. Operations 856, 861 and/or 866 are substantially similar to an inclusive subset of operations carried out under 806, 811 and/or 816 and are a result of calibration and optimizations performed in method 800. Steps 856, 861 and/or 866 are optional depending on particular embodiment and algorithm employed. Operation 871 records the signal on the detector array 630. One or multiple measurement loops might be performed as suggested by loop-back arrow 880, and only some operations and not in any particular order might be performed. Multiple loops allow for acquisition of more data, equivalent to oversampling to provide better results using algorithms known in the art including, but not limited, averaging, integration, Fourier and Wavelet transforms, convolution, correlation, neural network-based algorithms and others.

Embodiments of optical systems described herein may be incorporated into various other apparatuses and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. An optical apparatus comprising:
   a first element comprising a waveguide-based frequency-selective structure with one or more input ports and N1 output ports where N1 or 2 or more, the structure characterized by a free spectral range and a cyclic property such that if one input signal in a pair of input signals separated by a frequency that is approximately an integer multiple of the free spectral range is routed onto a particular output port, the other input signal in the pair is routed onto the particular output port;
   N2 waveguides, where 1<=N2<=N1, each waveguide having a waveguide input port coupled to a corresponding one of the N1 output ports, and a waveguide output port;
   N3 frequency-selective second elements where 1<=N3<=N2, each of the N3 second elements having an input port coupled to a corresponding one of the N2 waveguide output ports and an output surface from which optical emission occurs at an angle dependent on optical frequency; and a third element configured to receive optical emission from the N3 output surfaces, detecting a corresponding spatial pattern of optical intensity.

2. The apparatus of claim 1 wherein the waveguide-based frequency-selective structure in the first element is an arrayed waveguide grating and wherein the frequency selective second elements comprise Bragg gratings.

3. The apparatus of claim 1 wherein said third element is a 2-dimensional array of photo-detectors.

4. The apparatus of claim 1 wherein said third element is a 1-dimensional array of photo-detectors.

5. The apparatus of claim 1 wherein the waveguide-based frequency-selective structure in the first element includes a tuning element.

6. The apparatus of claim 1 additionally comprising N4 fourth elements, where $1<=N4<=(N1+1)$.
wherein said fourth elements comprise filter structures, each filter structure realized as one or more ring resonators; and
wherein one or more of said fourth elements includes a tuning element that can tune the resonant frequency of the corresponding one or more ring resonators.

7. The apparatus of claim 5, additionally comprising a fifth element;
wherein said fifth element is an electronic control circuit, connected to first and third elements, and capable of controlling and reading signals from the first and third elements.

8. The apparatus of claim 6, additionally comprising a fifth element;
wherein said fifth element is an electronic control circuit, connected to first, third and fourth elements, and capable of controlling and reading signals from the first, third and fourth elements.

9. Two of the apparatus of claim 7, each of the two apparati additionally comprising one or more sixth elements;
wherein each of the sixth elements has one or more input ports and two or more output ports, and is capable of providing broadband de-multiplexing; and
wherein the output ports of each sixth element are connected to the two apparati.

10. Two of the apparatus of claim 8, each of the two apparati additionally comprising one or more sixth elements;
wherein each of the sixth elements has one or more input ports and two or more output ports, and is capable of providing broadband de-multiplexing; and
wherein the output ports of each sixth element are connected to the two apparati.

11. A method for calibrating an optical spectrometer comprising the apparatus of claim 1, the method comprising:
providing an input signal from a calibration source with known spectral output; and
calculating calibration coefficients to match the recorded third element response to the input signal from the calibration source.

12. The method of claim 11,
wherein the method further comprises controlling the first element, while recording third element responses.

13. The method of claim 11,
wherein the method further comprises controlling an input filter element, present before the first element, while recording third element responses.

14. The method of claim 11, further comprising:
controlling one or more output filter elements, present between first and second elements, while recording third element responses.

15. A method for performing measurements using an optical spectrometer comprising the apparatus of claim 1, the method comprising:
providing an input signal from a measured to the optical spectrometer;
recording third element responses; and
calculating a measurement result using predetermined calibration coefficients and the recorded third element responses to the input signal from the measured.

16. The method of claim 15,
wherein the method further comprises controlling the first element, while recording third element responses.

17. The method of claim 15,
wherein the method further comprises controlling an input filter element, present before the first element, while recording third element responses.

18. The method of claim 15, further comprising:
controlling one or more output filter elements, present between first and second elements, while recording third element responses.

* * * * *